Dec. 18, 1945.  C. D. PETERSON ET AL  2,391,268
SYNCHRONIZING CLUTCH
Filed Oct. 3, 1944   2 Sheets-Sheet 1

INVENTORS
CARL D. PETERSON
ROBERT R. BURKHALTER
BY
Bodell & Thompson
ATTORNEYS

Dec. 18, 1945.  C. D. PETERSON ET AL  2,391,268
SYNCHRONIZING CLUTCH
Filed Oct. 3, 1944  2 Sheets-Sheet 2

INVENTORS
CARL D. PETERSON.
ROBERT R. BURKHALTER
BY
ATTORNEYS

Patented Dec. 18, 1945

2,391,268

UNITED STATES PATENT OFFICE 2,391,268

SYNCHRONIZING CLUTCH

Carl D. Peterson and Robert R. Burkhalter, Toledo, Ohio

Application October 3, 1944, Serial No. 556,963

7 Claims. (Cl. 192—53)

This invention relates to synchronizing clutches or clutches in which the shifting in of the toothed or jaw members is restrained until the speeds of the two elements to be clutched together approach synchronization.

The invention has for its object a simple, economical and readily assembled structure of friction member and the toothed or jaw member, and the structure and arrangement or correlation of the yielding or spring means between the friction and the toothed members for causing them to initially shift as a unit and to permit relative shifting in of the toothed member relatively to the other or friction member when the speeds synchronize.

The invention consists in the novel features and in the combinations and constructions hereinafter set forth and claimed.

In describing this invention, reference is had to the accompanying drawings in which like characters designate corresponding parts in all the views.

Figure 1:
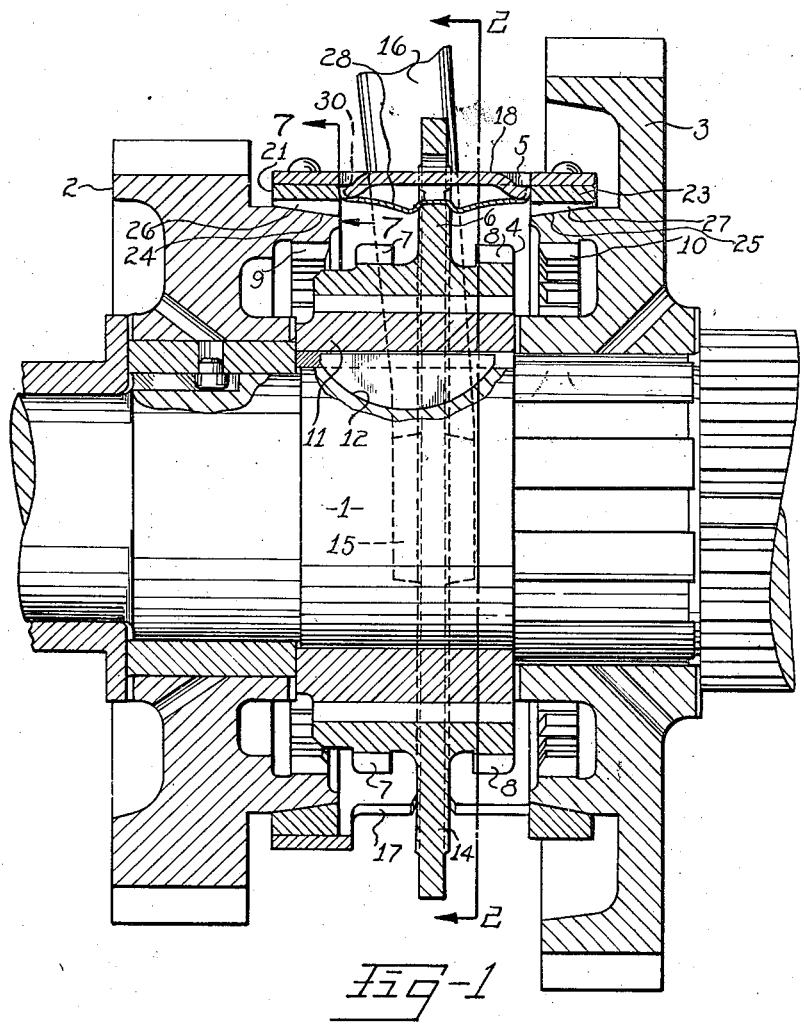
Figure 1 is a longitudinal sectional view of a synchronizing clutch embodying this invention, the adjacent portion of the coacting elements of a transmission gearing being also shown.
Figures 6, 7:
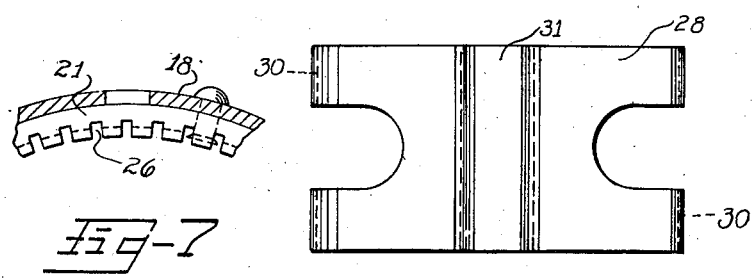
Figure 6 is an enlarged plan view of the bow spring constituting the yielding means between the clutch members.
Figure 7 is a fragmentary sectional view on line 7—7, Figure 1.
Figure 2:
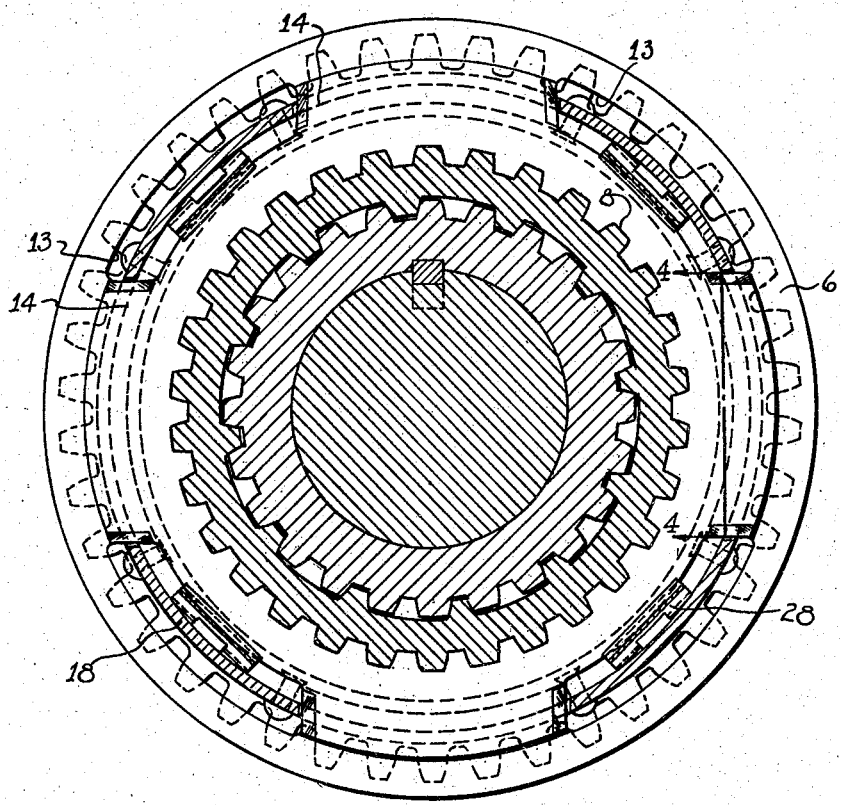
Figure 2 is a sectional view on line 2—2, Figure 1.
Figures 3, 4, 5:
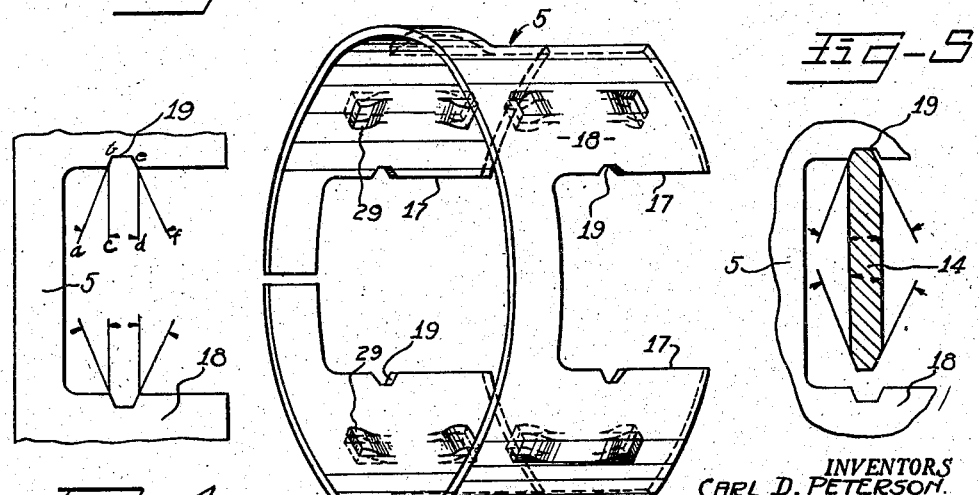
Figure 3 is a detail isometric view of the friction sleeve member.
Figures 4 and 5 are sectional views on line 4—4, Figure 2, parts being omitted in Figure 4.

For the purpose of this description, the numeral 1 designates a driving element or shaft, and 2 and 3 driven elements selectively clutchable to the driving element 1 through the clutch construction forming the subject matter of this invention. The driving element, as here shown, is a shaft and the driven elements, gears clutchable to the shaft, these being gears of trains to a final drive or tail shaft of a transmission gearing, although the reverse may be the fact, that the shaft 1 is a driven shaft and the gears 2, 3 the final drive gears in trains actuated by a prime moving shaft. The gears 2, 3 are here shown as rotatably mounted on or concentric with the shaft 1.

4 and 5 designate respectively the toothed or jaw member and the friction member of this clutch, the toothed member being mounted on the shaft 1 to rotate therewith and shift axially thereof, and the friction member 5 being a cylindrical band having friction faces at its opposite ends. The member 4 is an integral or one-piece structure formed with a hub and a peripheral annular flange 6 and with sets of peripheral clutch teeth or jaws 7 and 8 on the hub on opposite sides of the flange 6 and coacting with complemental sets of internal clutch teeth 9, 10 on the cylindrical flanges of the gears 2, 3 respectively. The hub is here shown as slidably splined on a collar 11 keyed to the shaft 1 at 12. The annular flange 6 is formed with transverse arcuate slots 13 extending in a circumferential direction providing webs 14 between the ends of the slots. The outer rim of the flange 6 coacts with shifting means and extends into grooves in shoes or blocks 15 on a shifting fork 16.

The band 5 is preferably formed up of sheet metal in any suitable manner and provided with lengthwise slots 17 at intervals which open through one end only of the band, thus providing lengthwise prongs 18. The prongs 18 extend through the arcuate slots 13 and the prongs and the slots are provided with means for blocking engagement until the speeds synchronize, except when an abutment or undue shifting-in force is applied. This means in itself forms no part of this invention and the action thereof is well known.

The slots 17 are provided with notches 19 in their side walls for coacting with the end walls of the webs 14 between the arcuate slots 13, to block axial shifting in of the toothed clutch member 4 until the speeds are synchronized. The end walls of the notches 19 and also the end walls of the webs 14 are formed beveled to coact cam fashion, so that when the speeds approach synchronization and the shifting-in force continues to be applied with sufficient force, the band member 5 will be rocked circumferentially sufficiently to permit the portions of the webs 14 between the arcuate slots to pass unobstructedly lengthwise of the slots 17 and hence permit the clutch teeth 7 to engage the clutch teeth 9 or the clutch teeth 8 to engage the clutch teeth 10, in accordance with the direction of the shifting-in force. The end walls of the notches 19 are inclined or beveled and the margins of the webs 14 complementally beveled to coact cam, wedge or inclined-plane fashion to make the shifting in both directions as uniform as possible.

In so far as shifting-in force is required, the wall or one end of each notch 19 is of a different angle from that at the other end. For example, the angle "a," "b," "c," which blocks the upshift is greater than the angle "d," "e," "f" which controls the down-shift. The band or friction member 5 is provided with rings 21, 23 at its opposite ends, which are provided with friction faces for coacting with complemental friction faces 24, 25 on the gears 2 and 3 respectively. The friction rings 21, 23 are preferably provided with transverse grooves 26 and 27 in their friction faces for facilitating the function of the clutching elements. The grooves quickly wipe away excess oil and permit the friction faces to coact efficiently and expeditiously. The walls of the slots and particularly the notches are hardened and the sheet metal from which the band is formed is relatively soft for long wear or for resisting blocking over an indefinite period.

The yielding means or springs for normally causing the two members 4, 5 to shift as a unit, and thus bring the friction ring 21 or 23 into frictional engagement with the complemental frictional faces 24, 25 in accordance with the direction in which the shift is made from neutral, consists of bow springs 28 extending through the arcuate slots 13 respectively and lengthwise of the band or friction member 5 radially inward from the prongs 18 and having their apices frictionally engaged with the inner walls of the arcuate slots 13, and their ends seated in suitable sockets or seats in the band member 5 or the prongs 18 thereof. The ends of the springs and the seats are formed to engage with a snap action and the seats are so spaced that the springs are loaded while being placed in the seats. As here illustrated, these seats are formed by striking tongues as 29, from the band member 5, thus providing slots in which the ends of the springs 28 are seated, the ends being curved as shown at 30 to seat in the slots. The ends of the tongues provide shoulders for locating the friction members or bands 21, 23. The intermediate portions of the springs 28 are formed with depressions 31 which receive the inner arcuate walls of the slots 13. The side walls of these depressions and the walls of the slots coact cam fashion, so that the member 4 can be shifted axially relatively to the member 5, when the speeds are synchronized and the shifting-in force continues to be applied. However, the friction between the depressions 31 and the walls of the arcuate slots is sufficient to cause the members 4, 5 to shift as a unit until one or the other of the friction faces of the band member is stopped in its axial shifting movement by the complemental friction face on the gear 2 or 3.

By reason of the construction of the members 4 and 5 and of the springs 28 and the relative arrangements thereof, this clutch is particularly economical to manufacture, yet extremely strong and durable in use and is used in situations where heretofore clutches of a more costly construction have been used.

What we claim is:

1. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member and including a cylindrical band having lengthwise slots opening through one end only of the band, the portions between the lengthwise slots constituting prongs extending through the arcuate slots of the flange, the prongs coacting at their side edges with the end walls of the arcuate slots to block relative shifting movement until the speeds of the driving and driven elements approach synchronization, and means extending through at least one of the arcuate slots and coacting between its ends with said flange and secured at its ends to said other member, to resist said relative shifting movement of said members, and shifting means coacting with said flange.

2. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a cylindrical band having lengthwise slots opening through one end only of the band, the portions between the lengthwise slots constituting prongs extending through the arcuate slots of the flange, the prongs coacting at their side edges with the end walls of the arcuate slots to block relative shifting movement until the speeds of the driving and driven elements approach synchronization, a spring extending lengthwise of at least one of the prongs and anchored at its ends thereto and having its intermediate portion yieldingly engaged with a wall of one of the arcuate slots to resist relative shifting movement of said members, and shifting means coacting with said flange.

3. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a cylindrical band having lengthwise slots opening through one end only of the band, the portions between the lengthwise slots constituting prongs extending through the arcuate slots of the flange, the prongs coacting at their side edges with the end walls of the arcuate slots to block relative shifting movement until the speeds of the driving and driven elements approach synchronization, a bow spring extending through at least one of the arcuate slots lengthwise of the band member and yieldingly coacting at its apex with a wall of the arcuate slot and abutting at its ends against the band member to yieldingly resist relative shifting movement of said members, and shifting means coacting with said flange.

4. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a cylindrical band having lengthwise slots opening through one end only of the band, the portions between the lengthwise slots constituting prongs extending through the arcuate slots of the flange, the prongs coacting at their side edges with the end walls of the arcuate slots to block relative shifting movement until the speeds of the driving and driven elements approach synchronization, a bow spring extending through at least one of the arcuate slots lengthwise of the band member and yieldingly coacting at its apex with a wall of the arcuate slot and abutting at its ends against the band member to yieldingly resist relative shifting movement of said members, and shifting means coacting with said flange, the bow spring being anchored to the band member by a snap action.

5. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a cylindrical band having lengthwise slots opening through one end only of the band, the portions between the lengthwise slots constituting prongs extending through the arcuate slots of the flange, the prongs coacting at their side edges with the end walls of the arcuate slots to block relative shifting movement until the speeds of the driving and driven elements approach synchronization, a bow spring extending through at least one of the arcuate slots lengthwise of the band member and yieldingly coacting at its apex with a wall of the arcuate slot and abutting at its ends against the band member to yieldingly resist relative shifting movement of said members, and shifting means coacting with said flange, the prongs of the band member being formed with seats for receiving the ends of the spring and so spaced that the spring is loaded when the ends thereof are located in the seats.

6. In a synchronizing clutch of the type shiftable in opposite directions from neutral to connect together driving and driven elements through different speed ratios, including two members, one being a one-piece toothed member rotatable with and shiftable axially of one of said elements into and out of clutching engagement and having an integral annular peripheral flange for coacting with the shifting means, the flange being formed with circumferentially extending, arcuate slots, the other being a friction member including a cylindrical band having lengthwise slots opening through one end only of the member, the portions between the lengthwise slots constituting prongs arcuate in cross-section and extending through the arcuate slots, the prongs coacting at their side edges with the end walls of the arcuate slots to block relative shifting movement until the speeds of the two parts to be clutched together approach synchronization, and spring means extending through the arcuate slots lengthwise of the prongs and yieldingly coacting between their ends with the inner walls of the arcuate slots and being secured at their ends to the prongs.

7. In a synchronizing clutch of the type shiftable in opposite directions from neutral to connect together driving and driven elements through different speed ratios, including two members, one being a one-piece toothed member rotatable with and shiftable axially of one of said elements into and out of clutching engagement and having an integral annular peripheral flange for coacting with the shifting means, the flange being formed with circumferentially extending, arcuate slots, the other being a friction member including a cylindrical band having lengthwise slots opening through one end only of the member, the portions between the lengthwise slots constituting prongs arcuate in cross-section and extending through the arcuate slots, the prongs coacting at their side edges with the end walls of the arcuate slots to block relative shifting movement until the speeds of the two parts to be clutched together approach synchronization, and spring means extending through the arcuate slots lengthwise of the prongs and yieldingly coacting between their ends with the inner walls of the arcuate slots and being secured at their ends to the prongs, the prongs being formed with seats and the springs being formed at their ends to engage the seats with a snap action.

CARL D. PETERSON.
ROBERT R. BURKHALTER.